(12) United States Patent
Hamill

(10) Patent No.: US 10,679,238 B2
(45) Date of Patent: *Jun. 9, 2020

(54) SYSTEMS AND METHODS FOR DYNAMICALLY MODIFYING FUNCTIONALITY AND CONTENT OF A MOBILE APPLICATION BASED ON LOCATION CRITERIA

(71) Applicant: Kocomojo, LLC, Sarasota, FL (US)

(72) Inventor: Kristan Hamill, Nokomis, FL (US)

(73) Assignee: Kocomojo, LLC, Sarasota, FL (US)

( * ) Notice: Subject to any disclaimer, the term of this patent is extended or adjusted under 35 U.S.C. 154(b) by 374 days.

This patent is subject to a terminal disclaimer.

(21) Appl. No.: 15/823,519

(22) Filed: Nov. 27, 2017

(65) Prior Publication Data
US 2018/0082324 A1    Mar. 22, 2018

Related U.S. Application Data

(63) Continuation of application No. 15/204,312, filed on Jul. 7, 2016, now Pat. No. 9,830,611.

(51) Int. Cl.
*G06Q 30/02* (2012.01)
*H04L 12/58* (2006.01)
(Continued)

(52) U.S. Cl.
CPC ..... *G06Q 30/0235* (2013.01); *G06Q 30/0261* (2013.01); *H04L 51/20* (2013.01);
(Continued)

(58) Field of Classification Search
CPC ......... H04L 29/08108; H04L 29/08657; H04L 29/08936; H04W 4/02; H04W 64/00;
(Continued)

(56) References Cited

U.S. PATENT DOCUMENTS 7,167,889 B2    1/2007   Busaba
8,135,413 B2 *  3/2012   Dupray ................ H04W 4/029
                                                455/456.1
(Continued)

*Primary Examiner* — Sharad Rampuria
(74) *Attorney, Agent, or Firm* — Sheppard Mullin Richter & Hampton LLP

(57) ABSTRACT

This disclosure relates to system and methods for dynamically modifying functionality and content of a mobile application based on location criteria. User-selected application requirements including location requirement, time period requirement, and/or other information may be obtained. User-selected functionality and content information specifying application functionalities may be obtained. User information including current end user's location information, user demographic, and/or other information may be obtained. The current end user's location information may be compared with the user-specified by the location requirement. A determination may be made whether the current end user's location information satisfies the user-selected location requirement. A current time may be compared with the user-selected time period requirement. A determination may be made whether the current time satisfies the user-selected time period requirement. Responsive to the current end user's location information and the current time, application functionality and content, including personalized user content of the mobile application may be generated.

16 Claims, 6 Drawing Sheets

(51) Int. Cl.
*H04W 4/14* (2009.01)
*H04W 4/029* (2018.01)

(52) U.S. Cl.
CPC .............. *H04L 51/32* (2013.01); *H04W 4/029* (2018.02); *H04W 4/14* (2013.01)

(58) Field of Classification Search
CPC ..... H04W 4/00; G06Q 30/02; G06Q 30/0207; G06Q 30/0214; G06Q 30/0221; G06Q 30/0231; G06Q 30/0232; G06Q 30/0233; G06Q 30/0234; G06Q 30/0235; G06Q 30/0236; G06Q 30/0238; G06Q 30/0239; G06Q 30/0241; G06Q 30/0242; G06Q 30/0251; G06Q 30/0252; G06Q 30/0266; G06Q 30/0271
See application file for complete search history.

(56) References Cited

U.S. PATENT DOCUMENTS

| | | | |
|---|---|---|---|
| 8,229,458 B2 * | 7/2012 | Busch | H04W 4/30 455/456.1 |
| 8,620,285 B2 * | 12/2013 | Ramer | G06Q 30/02 455/414.1 |
| 8,635,106 B2 * | 1/2014 | Sarukkai | H04W 28/06 455/414.1 |
| 2013/0053005 A1 | 2/2013 | Ramer | |
| 2013/0073374 A1 * | 3/2013 | Heath | G06Q 30/02 705/14.39 |
| 2015/0120767 A1 | 4/2015 | Skeen | |
| 2016/0171540 A1 | 6/2016 | Mangipudi | |
| 2017/0076306 A1 | 3/2017 | Snider | |

\* cited by examiner

SYSTEMS AND METHODS FOR DYNAMICALLY MODIFYING FUNCTIONALITY AND CONTENT OF A MOBILE APPLICATION BASED ON LOCATION CRITERIA

CROSS-REFERENCE TO RELATED APPLICATIONS

This application is a continuation of U.S. patent application Ser. No. 15/204,312, filed on Jul. 7, 2016, which is incorporated by reference herein.

FIELD

The disclosure relates to systems and methods for dynamically modifying functionality and content of a mobile application based on location criteria.

BACKGROUND

Many businesses and other entities use mobile applications as a way to connect with customers. The cost of independently creating, maintaining and modifying these mobile applications can be significant. Other drawbacks exist.

SUMMARY

The disclosure relates to dynamically modifying application components (e.g., functionality and content) of a mobile application based on location and/or other criteria set by a business or other entity. The invention includes a mobile application that includes core functionality and an administrative user interface of that mobile application connected to a server through which the entity can specify trigger criteria (e.g., location and/or other criteria), which when met, will trigger the server to generate code and/or content which is transmitted to the mobile application to change the functionality and content of the mobile application. Via the administrative user interface of the mobile application connected to the server, the entity may specify the application components (e.g., desired functionality and content) of the mobile application based on the trigger criteria.

As a simple example, a business can specify a trigger condition as being that a user is detected to be at a specified location (e.g., on or near the location of the business). The business may further select, from the available functionalities, the desired functionality and any desired content that should be available to the user via the mobile application when the trigger condition is satisfied. In response to detecting the trigger condition has been satisfied (e.g., that the user enters the specified location), the server may dynamically assemble the code corresponding to the selected functionalities, retrieve the specified content and transmit that to the mobile application. Upon receipt, the mobile application may be updated to enable the functionality and content to be available to the user via the mobile application.

The server may store sets of code that correspond to available functionalities (e.g., a messaging functionality, a payment functionality, and/or other functionalities) and the entity may select the desired functionalities for a given trigger condition. The entity may also select and/or input desired content (for example, display the business' logo and/or other business specific content as detailed below).

Optionally, when the user no longer meets the trigger criteria (or new trigger criteria is satisfied) the application components (e. g., functionality and content) may be changed again according to another set of preselected parameters.

The application functionality and content may be dynamically generated using a cloud-based data structure and/or services based on the end user satisfying requirements of real-world location, time period, and/or other requirements and pushed to mobile applications of end user's client computing platforms, in accordance with one or more implementations. Thus, the mobile application may dynamically change based on a specific selection of application functionalities without any additional input from the end user in response to a change in end user's location. In some implementations, a system configured to generate the dynamic application functionality and content may include one or more servers. The server(s) may be configured to communicate with one or more client computing platform according to a client/server architecture. The users of the system may access the system via client computing platform(s). The server(s) may include one or more physical processor(s) configured by machine-readable instructions. Processor(s) may be configured by machine-readable instructions 105. Machine-readable instructions 105 may include one or more computer program components. The machine-readable instructions may include one or more computer program components. The machine-readable instructions may include one or more of an application component, a user component, a comparison component, a functionality component, a content component, a presentation component, and/or other components.

A repository of application functionality and content data may be available via the system and/or the server(s). The repository of application functionality and content data may be any data structure configured to store all or part of the application functionality and content data that may be associated with different client computing platforms. The repository of application functionality and content data may comprise a computer readable medium as discussed herein. In some implementations, the data structure configured to store all or part of the application functionality and content data may store executable instructions (e.g., programming code) that may be configured to generate all or some of the application content and functionalities. The data structure configured to store all or part of the application functionality and content data may be a single database or any number of databases. In some implementations, different executable instructions may be stored in the data structure configured to store all or part of the application functionality and content data may perform different functions. For example, some of the executable instructions may add visual and functional renderings and/or other renderings to the application content and functionalities. In some implementations, the repository of application content and functionality data may be "cloud" based (i.e., remotely hosted structures and resources).

The application component may be configured to obtain a selection from a user specifying certain application information. The user-selected application information may include certain requirements that may have to be satisfied by an end user in order to dynamically generate application components (e.g., functionality and content) on a mobile application of the end user's computing platform. The requirements may include one or more of one or more real-world location requirements, a time period, one or more demographic characteristics, and/or other requirements. The application component may be configured to obtain a selection from a user specifying functionality information. The functionality information may include dynamically generated application functionalities and renderings within the mobile application of end user's computing platform and/or other information. The user may a business or other entity, the system administrator, a third party, and/or another type of user.

The application component may be configured to obtain one or more of real-world location requirements that may include a geographic location that may be defined by a geofence, a beacon, a real-world address, a manual user input, and/or other input. The geofence may be a region or an area defined with a boundary line. Crossing the boundary line and entering the area defined by the geofence may trigger the application content and functionalities, a notification to the end user, and/or other event. The beacon may be a smaller location that may be within the geofence.

One or more of real-world location requirements may include a geographic location that corresponds to a geographic address and/or a physical site. One or more real-world location requirements may include a physical site including a business, a venue, a museum, a public park, a private residence, and/or other physical site. One or more real-world location requirements may include a specific location within a physical site. One or more real-world location requirements may include a specific location that is different from the physical site including an event, a festival, a fair, and/or other geographic locations.

The application component may be configured to obtain one or more real-world location requirement that may include one or more locations, either of which, if satisfied by the end user, would dynamically generate application functionalities.

The application component may be configured to obtain one or more real-world location requirement that may include a radius around one or more locations that if satisfied by the end user would dynamically generate application functionalities.

The application component may be configured to obtain the time period that may include date and/or time information. The time period may include a one-time occurring time period, a periodically occurring time period, a regularly occurring time period, and/or other time periods. The application component may be configured to obtain no user-selected time period. In this circumstance, the application functionality and content functionalities may be dynamically generated for all time-periods.

In some implementations, the user-selected application information may specify demographic characteristics. Demographic characteristics may include age, gender, interests, hobbies, and/or other demographic information.

Application component may be configured to obtain user-selected content information that includes content information specifying dynamically generated application content within the mobile application of end user's computing platform and/or other information. Application content may include application layout information, application visual information, application demographic information, location information, and/or other application content.

Application component may be configured to obtain user-selected functionality information that includes functionality information specifying dynamically generated application functionalities and renderings within the mobile application of end user's computing platform and/or other information. Application functionalities may include a notification functionality, a promotion functionality, a reward functionality, a payment functionality, a tweet functionality, a network functionality, a messaging functionality, a gaming functionality, a survey functionality, and/or other functionalities. In some implementations, as additional application functionalities get created and become available for selection, application component may be configured to obtain user-selected functionality information that includes functionality information specifying newly available dynamically generated application functionalities and renderings. Thus, application component may continue to obtain functionality information without additional user input.

The application component may be configured to obtain user-selected functionality information that includes the notification functionality. The notification functionality may be configured within the mobile application to provide a notification to the end user based on the current user location information of the end user client computing platform obtained by the user component as discussed elsewhere herein. The notification may include a phone call, an email, a text message (e.g., an SMS message or other text message), a message within the mobile application, a message in a social networking platform (e.g., Facebook, LinkedIn, Foursquare, Google+, Instagram, Snapchat and/or other social networking platforms), a micro-blogging service message (e.g., such as a message in the platform provided by Twitter, the platform provided by Tumblr, Blogger, Vine, and/or other micro-blogging platforms), and/or other notifications. The triggering of the notification may be conditioned on a time at which the geofence was entered.

The application component may be configured to obtain user-selected functionality information that includes the promotion functionality. The promotion functionality may be configured to provide promotion information to the end user within the mobile application. The promotion functionality may be configured such that the mobile application may include information related to a business advertisement or an offer specific associated with a business within the real-world location. The promotion functionality may include promotional information including a business name, a logo, a promotional offer, a discount, an image containing promotional information, a video containing promotional information, and/or other promotional information. The promotion functionality may be configured such that the mobile application includes a link to a promotion or offer that takes the end user outside of the mobile application directly to the promoter's web site. The promotion functionality may be configured to provide promotional information to the end user based on the real-world location of the end user obtained by the user component as discussed elsewhere herein.

The promotion functionality may be configured to provide a promotion notification to the end user based on the current real-world location of the end user obtained by the user component as discussed elsewhere herein. Determination that the end user has entered the geofence may be made by the user component based on the current user location information of the second client computing platform. The promotion notification may indicate to the end user that entered the geofence that a promotion is available. The promotion notification may include a phone call, an email, a text message (e.g., an SMS message or other text message), a message within the mobile application, a message in a social networking platform (e.g., Facebook, LinkedIn, Foursquare, Google+, Instagram, Snapchat and/or other social networking platforms), a micro-blogging service message (e.g., such as a message in the platform provided by Twitter, the platform provided by Tumblr, Blogger, Vine, and/or other micro-blogging platforms), and/or other notifications. The triggering of the promotion notification may be conditioned on a time at which the geofence was entered.

The application component may be configured to obtain user-selected functionality information that includes the reward functionality. The reward functionality may be configured to provide reward information to the end user within the mobile application. The reward functionality may be configured such that the mobile application includes information related to rewards offered by specific business or other entity associated with the real-world location to the end users. The reward functionality may include reward information including a business name, a logo, reward points earned, levels attained, badges collected, an image containing reward information, a video containing reward information, and/or other reward information. The reward functionality may be configured such that the mobile application includes a link to the reward information that takes the end user outside of the mobile application directly to the business establishment's web site.

The reward functionality may be configured to provide a reward notification to the end user based on the current real-world location of the end user obtained by the user component as discussed elsewhere herein. For example, a restaurant may have a special reward only for customers that have visited a certain location within a certain time period. Determination that the end user has entered the geofence may be made by the user component based real-world location information for the end user. The reward notification may indicate to the end user that entered the geofence that a reward is available. The reward notification may include a phone call, an email, a text message (e.g., an SMS message or other text message), a message within the mobile application, a message in a social networking platform (e.g., Facebook, LinkedIn, Foursquare, Google+, Instagram, Snapchat and/or other social networking platforms), a micro-blogging service message (e.g., such as a message in the platform provided by Twitter, the platform provided by Tumblr, Blogger, Vine, and/or other micro-blogging platforms), and/or other notifications. The triggering of the reward notification may be conditioned on a time at which the geofence was entered. For example, there may be a time period during which entering the geofence results in the triggering of the reward notification. As an example, there may be a time period during which entering the geofence does not result in the triggering of the reward notification (e.g., if it would otherwise).

The application component may be configured to obtain user-selected functionality information that includes the payment functionality. The payment functionality may be configured to provide digital payment option information to the end user within the mobile application. The payment functionality may be configured such that the mobile application includes information related to the digital payment options offered by specific business establishments associated with the real-world location to the end users. The Payment functionality may include payment option information including a business name, a logo, a type of digital payment offered, and/or other payment option information.

Application component may be configured to obtain user-selected functionality information that includes the tweet functionality. The tweet functionality may be configured to provide an ability to participate in a Twitter type of micro blogging by the end user within the mobile application. The tweet functionality may be configured such that the mobile application includes Twitter related functionality within the mobile application. In some implementations, the tweet functionality may contain Twitter related functionality including a hashtag, a location identification, and/or other functionality.

The application component may be configured to obtain user-selected functionality information that includes the network functionality. The network functionality may be configured to provide a social networking capabilities to the end user within the mobile application. The network functionality may be configured such that the mobile application includes social networking capabilities within the mobile application by providing social networking access to all users within the geographic location defined by the geofence, the beacon, and/or other input. The network functionality may include social networking capabilities including viewing participating end users currently at the same real-world location and utilizing the mobile application, posting status updates visible to other users within the mobile application, sending notifications individual users within the mobile application, sending notifications to a group of users within the mobile application, and/or other capabilities.

The application component may be configured to obtain user-selected functionality information that includes the messaging functionality. The messaging functionality may be configured to provide communication capabilities to the end user within the mobile application. The communication capabilities may be configured such that the mobile application includes a messaging portal within the mobile application that may be available to all mobile application users within the geographic location defined by the geofence, the beacon, and/or other input. The messaging functionality may include sending messages to a business entity, sending messages to other individual participating end users currently at the same real-world location and utilizing the mobile application, sending group messages to other participating end users, and/or other capabilities. For example, an end user currently residing in a hotel may utilize messaging functionality to contact concierge with a room service order detail.

The application component may be configured to obtain user-selected functionality information that includes the gaming functionality. The gaming functionality may be configured to provide gaming capabilities to the end user within the mobile application. The gaming capabilities may be configured such that the mobile application includes a gaming portal within the mobile application that may be available to all mobile application users within the geographic location defined by the geofence, the beacon, and/or other input. The gaming portal may allow users to participate, observe, and/or otherwise interact with various mobile games, including trivia games, puzzle games, games of skill, games of luck and/or other games. Gaming functionality may be utilized by individual users as a single player games or may be played with other participating end users currently at the same real-world location and utilizing the mobile application, sending group messages to other participating end users, and/or other capabilities. For example, an end user currently residing in hotel may engage in a game of scrabble with other hotel guests and rewarded by the hotel with a free breakfast for winning the game.

The application component may be configured to obtain user-selected functionality information that includes the survey functionality. The survey functionality may be configured to provide users with an ability to request feedback from end users within the mobile application. The survey functionality may be configured within the mobile application to provide users with an ability send surveys to the end user based on the current user location information of the end user client computing platform obtained by the user component as discussed elsewhere herein. Survey may include survey information including a list of question, a score card, an input for a review, and/or other information. For example, an end user currently residing in hotel may be asked to fill out a satisfaction survey concerning his most recent room service experience.

The user component may be configured to obtain current user location information indicating a current real-world location of a client computing platform associated with the end user. The current real-world location of a client computing platform associated with the end user may include determination of a real-world position or a geographic location of the end user. The user component may be configured to use the client computing platform to determine the geographic location of the end user based on one or more of signal strength, GPS, beacons, mesh networks such as Zigbee, cell tower triangulation, Wi-Fi location, receipt of real-world location from server, and/or other input.

The comparison component may be configured to compare user information associated with the end user obtained by the user component including current location information of the end user client computing platform, one or more demographic characteristics of the end user, and/or other information with the user-selected application information obtained by the application component specifying one or more of one or more real-world location requirements, one or more demographic characteristics, and/or other requirements. The comparison component may be configured to compare the current time with the specified time period obtained by the application component.

The comparison component may be configured to determine whether information associated with the end user obtained by the user component including current location information of the end user client computing platform, one or more demographic characteristics of the end user, and/or other information that satisfies the user-selected application information obtained by the application component specifying one or more of one or more real-world location requirements, one or more demographic characteristics, and/or other requirements. The comparison component may be configured to determine whether the current time satisfies the specified time period obtained by the application component.

The functionality component may determine and/or obtain functionality information specifying dynamically generated application functionalities and renderings available in the mobile application of the end user's computing platform and/or other information obtained by the functionality component and may include the notification functionality, the promotion functionality, the reward functionality, the payment functionality, the tweet functionality, the network functionality, the messaging functionality, the gaming functionality, the survey functionality and/or other functionalities. Based upon the user-selected functionality information, the functionality component may determine which functionality may be dynamically generated within the mobile application. The functionality component may determine additional information specific to the end user based on the demographic and/or other information obtained by the user component. Additional information may include the functionality layout information, design information, and/or other information.

The content component may be configured to determine and/or obtain the content information specifying mobile application content dynamically generated within the mobile application of the end user's computing platform and corresponding to the user-selected content information obtained by the application component. The content information specifying the mobile application content may include layout information, application visual information, application demographic information, location, and/or other application content.

The presentation component may be configured to effectuate presentation of the application functionality and content to the end user in response to the determination by the comparison component that information associated with the end user obtained by the user component including current location information of the second client computing platform, one or more demographic characteristics of the second, and/or other information satisfies the user-selected application information obtained by the application component specifying one or more real-world location requirements, one or more demographic characteristics, and/or other requirements. Presentation component may be configured to effectuate presentation of the application functionality and content in response to the determination by the comparison component that the current time satisfies the specified time period obtained by the application component.

The presentation component may be configured to effectuate presentation of the application information obtained by the application component. The application information may include one or more of real-world location information, the time period, and/or other information. The presentation component may be configured to effectuate presentation of the user information obtained by the user component. The user information obtained by the user component may include user demographic information, such as name, age, interests, and preferences. The presentation component may be configured to effectuate presentation of the functionality information determined and/or obtained by the functionality component. The application functionalities may include the notification functionality, the promotion functionality, the reward functionality, the payment functionality, the tweet functionality, the network functionality, and/or other functionalities. The presentation component may be configured to effectuate presentation of the functionality information based on the application information obtained by the application component, the user information obtained by the user component, and/or other information.

The presentation component may be configured to effectuate presentation of the application content obtained by content component. The application content may include the application layout information, application visual information, application demographic information, location, and/or other application content. In some implementations, the application content may be configured to include certain contextually specific application content.

These and other objects, feature, and characteristics of the system and/or method disclosed herein, as well as the methods of operation, functions of the related elements of structure, the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
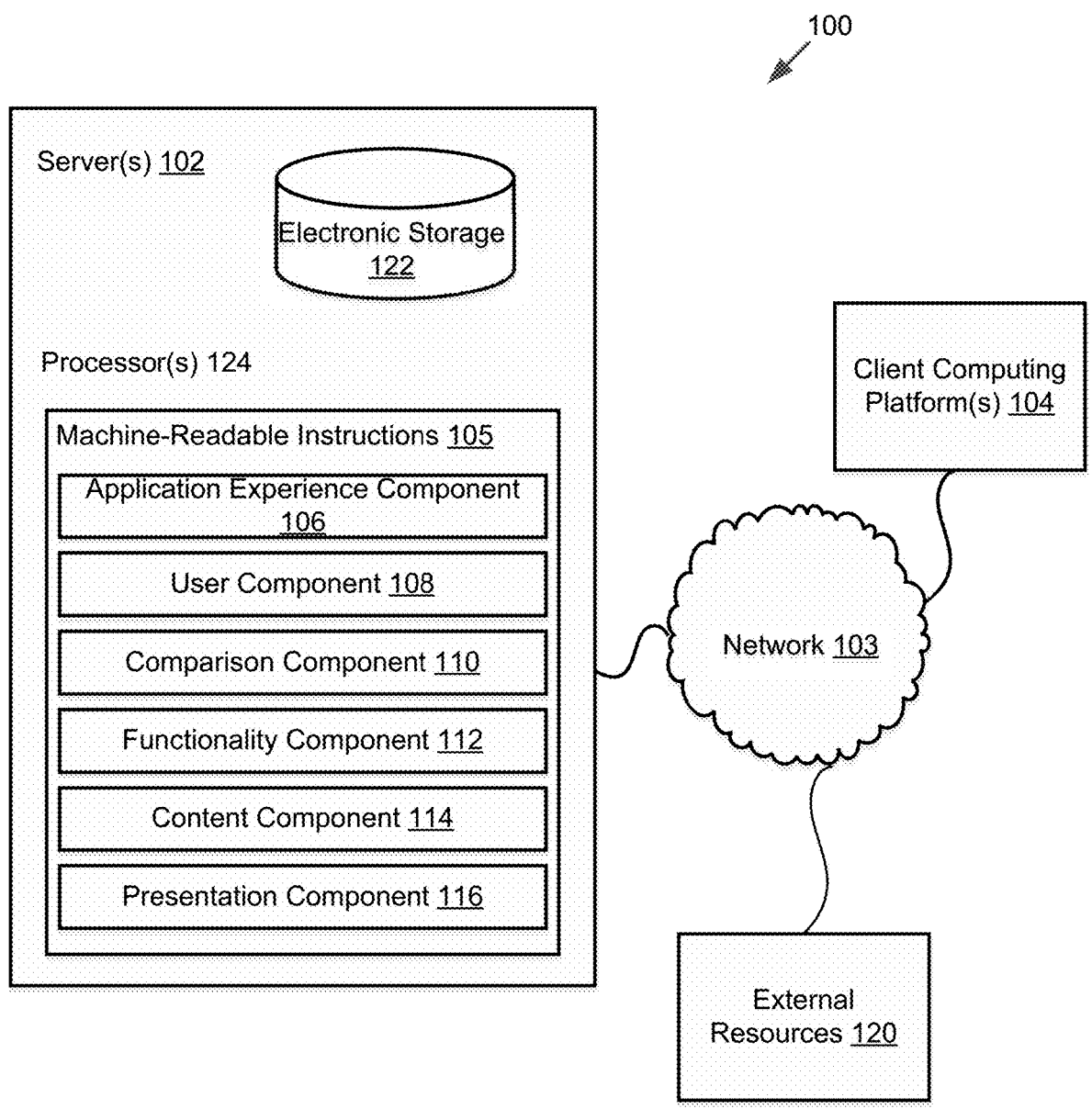
FIG. 1 illustrates a system configured for dynamically modifying functionality and content of a mobile application, in accordance with one or more implementations.

FIG. 1 illustrates a system configured for dynamically modifying functionality and content of a mobile application based on satisfying requirements of a real-world location, a time period, and/or other requirements set by a business or other entity. As is illustrated in FIG. 1, system 100 may include one or more servers 102. Server(s) 102 may be configured to communicate over network 103 with one or more client computing platform 104 according to a client/server architecture. Users may access system 100 via client computing platform(s) 104 associated with the users. The users of system 100 may include businesses or other entities, end users, and/or other users. The users may access the mobile application via client computing platform(s) 104.

Server(s) 102 may include one or more physical processor(s) 124 configured by machine-readable instructions 105. Processor(s) 124 may be configured by machine-readable instructions 105. Machine-readable instructions 105 may include one or more computer program components. The machine-readable instructions 105 may include one or more of application component 106, user component 108, comparison component 110, functionality component 112, content component 114, presentation component 116, and/or other components. Server 102 may be configured to store sets of code that correspond to available functionalities and the entity user may select the desired functionalities for a given trigger requirement. Trigger requirements may include requirements selected by business or entity users and/or other requirements.

A repository of functionalities and content may be available via system 100 and/or server(s) 102 (e.g., stored within electronic storage 122 and/or other storage location). The repository of functionalities and content may comprise a computer readable medium. The repository of functionalities and content may be data structure (e.g., a cloud-based data structure) configured to store information defining functionalities and content. In some implementations, the data structure configured to store all or part of the functionalities and content may store executable instructions (e.g., programming code) that may be configured to dynamically generate all or some of the functionalities and content. The data structure configured to store all or part of the functionalities and content may be a single database or any number of databases. In some implementations, different executable instructions may be stored in the data structure configured to store all or part of the functionalities and content may perform different functions. For example, some of the executable instructions may add visual and functional renderings and/or other renderings to the user experience.

Application component 106 may be configured to obtain user-selected information specifying application requirements, application functionalities, application content and/or other information. The user-selected information may be specified by a user that may be a business or other entity, system 100 administrator, a third party, and/or another type of user.

The user-selected application requirements may include application requirement information. Application requirement information may include certain application requirements that may have to be satisfied by an end user in order to trigger Server 102 to generate code and/or content which may be transmitted to the mobile application to change a functionality and content of the mobile application running on the end user's computing platform. The application requirement information may include one or more of one or more real-world location requirements, a time period, one or more demographic characteristics, and/or other requirements.

Application component 106 may be configured to obtain one or more of real-world location requirements that may include a geographic location that may be defined by a geofence, a beacon, a real-world address, a manual user input, and/or other input. The geofence may be a region or an area defined with a boundary line. Crossing the boundary line and entering the area defined by the geofence may trigger generation of application functionality and content and/or other event. The beacon may be a smaller location that may be within the geofence.

One or more of real-world location requirements may include a geographic location that corresponds to a geographic address and/or a physical site. One or more real-world location requirements may include a physical site including a business, a venue, a museum, a public park, a private residence, and/or other physical site. One or more real-world location requirements may include a specific location within a physical site. For example, a real-world location may be a certain retail store within a shopping center. One or more real-world location requirements may include a specific location that is different from the physical site including an event, a festival, a fair, and/or other geographic locations. For example, a real-world location may include a county fair that is taking place at a physical site of a county fairgrounds. One or more real-world location requirements may include both the specific location and the corresponding physical site. For example, a real-world location may include a specific exhibit within a museum and the physical site may include the museum.

Application component 106 may be configured to obtain one or more real-world location requirements that may include one or more locations, either of which, if satisfied by the end user, would trigger system 100 to generate application functionality and content of the mobile application. For example, real-world location requirements may include a county fair and county fairgrounds. An end user present at either of these real-world locations may trigger the generation of application functionality and content within the mobile application.

Application component 106 may be configured to obtain one or more real-world location requirements that may include a radius around one or more locations that, if satisfied by the end user, would trigger system 100 to generate application functionality and content of the mobile application. For example, real-world location requirements may include a 5-mile radius around a museum. An end user located within a 5-mile radius of the museum may trigger the generation of application functionality and content within the mobile application.

Application component 106 may be configured to obtain the user-selected time period that may include date and/or time information and/or other information. The time period information may include a one-time occurring time period, a periodically occurring time period, a regularly occurring time period, and/or other time periods. For example, a business or other entity user may select a real-world location requirement as a hair salon in Philadelphia, Pa. The entity user may further select a time period as business hours from 9 AM to 5 PM, Monday to Saturday. The application functionality and content may only be dynamically generated within the mobile application when the end user is located in the hair salon located in Philadelphia during business hours. In another example, an entity user may select a real-world location requirement as a county fair in Austin, Tex. The entity user may further select a periodically occurring time period such a month of July. In this example, the application functionality within the mobile application may be generated only for end users that are located at the real-world location of the county fair in Austin during the month of July.

In some implementations, application component 106 may be configured to obtain no user-selected time period. In this circumstance, the generation of application functionality and content within the mobile application may be triggered by all time-periods.

In some implementations, the user-selected application requirement information may specify demographic characteristics. Demographic characteristics may include age, gender, interests, hobbies, and/or other demographic information. For example, a business or other entity user may configure application requirements by specifying gender as the demographic characteristic that may have to be satisfied by an end user in order to trigger the application functionality on the mobile application of the end user's computing platform. Only the end user of a specific gender may be able to satisfy the demographic characteristic in order to trigger the dynamically generated functionality and content transmitted to the mobile application.

Figure 2A:
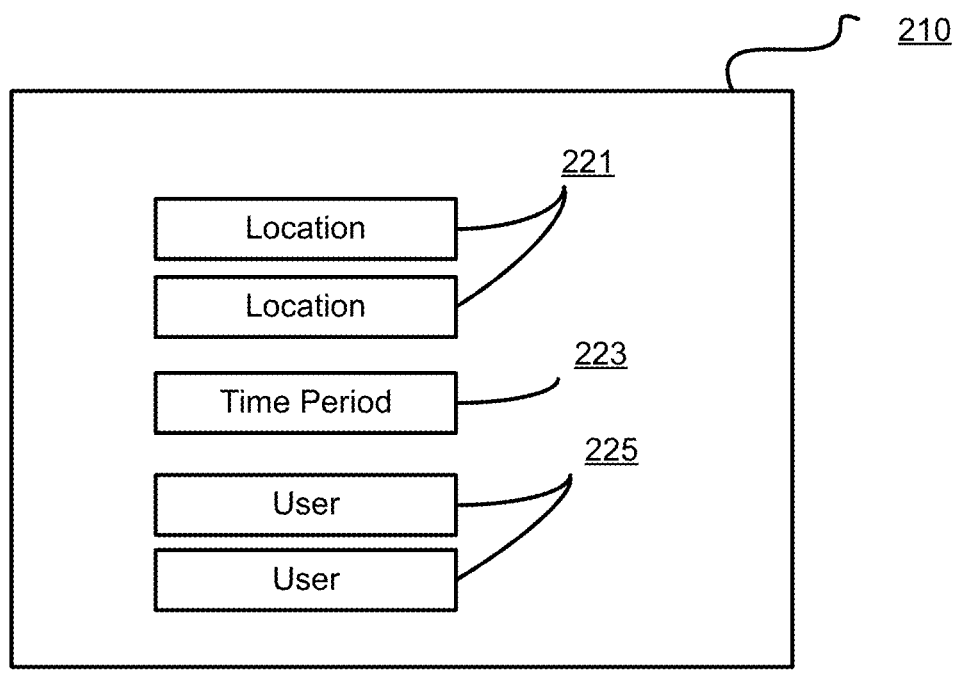
FIG. 2A illustrates a schematic of a graphical user interface to specify requirements for dynamically modifying functionality and content of a mobile application, in accordance with one or more implementations.
Figure 2B:
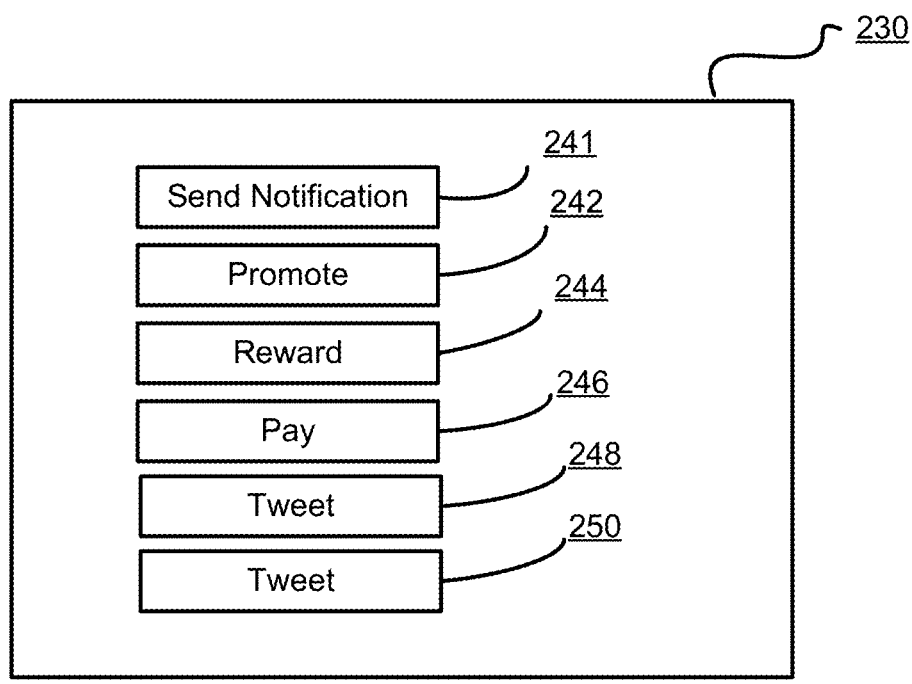
FIG. 2B illustrates a schematic of a graphical user interface to specify functionalities for dynamically modifying functionality and content of a mobile application, in accordance with one or more implementations.

In some implementations, the user-selected application requirement information may be specified via an administrative interface of the mobile application. By way of illustration, FIG. 2A illustrates view 210 of a graphical administrative user interface provided to business or other entity users to specify application requirements of the mobile application. View 210 may include one or more location fields 221, time period field 223, one or more user demographic field 225, and/or other fields. One or more location fields 221 may be configured to receive entry and/or selection of one or more real-world locations that if satisfied by an end user may trigger dynamically generated application functionalities, renderings, and content. Time period field 223 may be configured to receive entry and/or selection of a time period that if satisfied by an end user may trigger dynamically generated application functionalities, renderings, and content. One or more user demographic fields 225 may be configured to receive entry and/or selection of user demographic characteristics that if satisfied by an end user may trigger dynamically generated application functionalities, renderings, and content.

Referring back to FIG. 1, application component 106 may be configured to obtain user-selected application functionality specifying application functionality information including a selection of desired functionalities and/or other information to be dynamically generated within the mobile application of the end user's computing platform.

Figure 3:
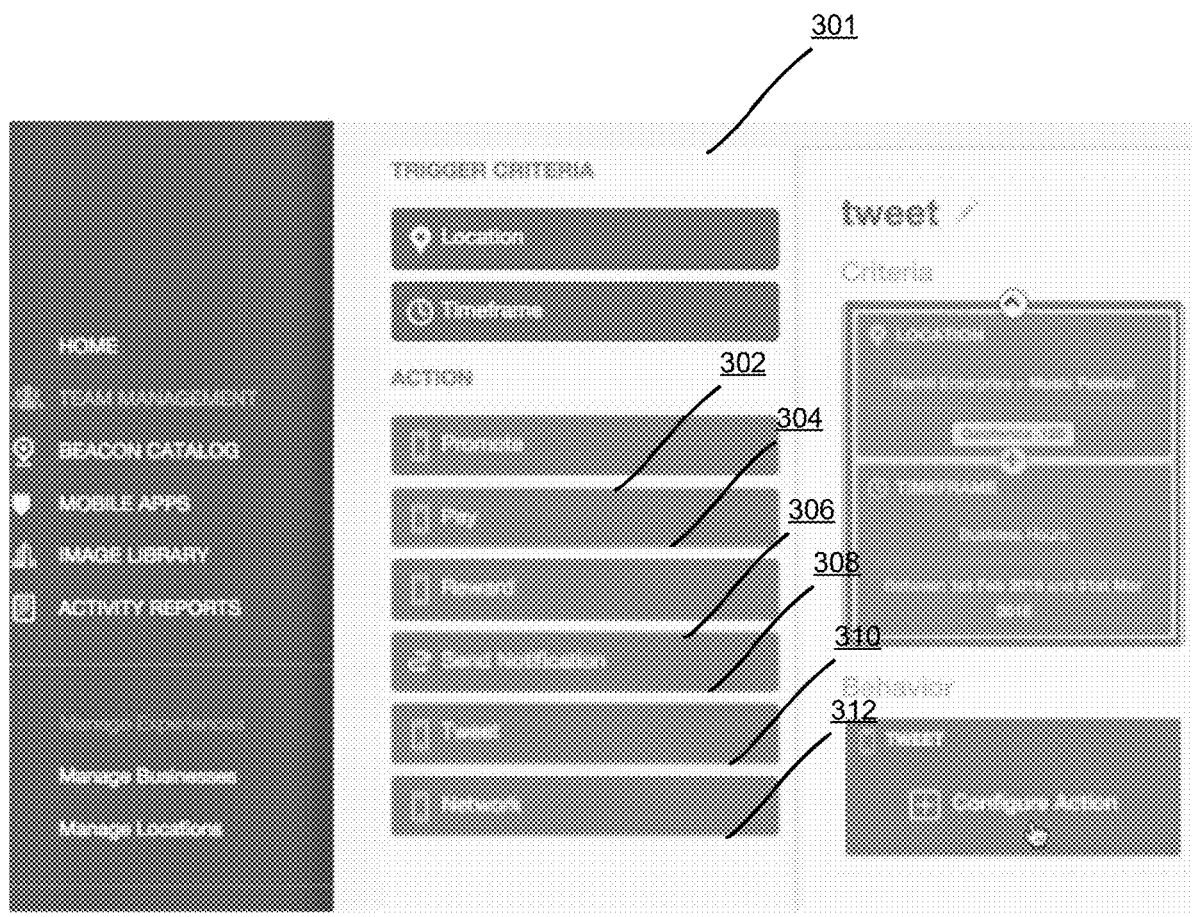
FIG. 3 illustrates an exemplary graphical user interface to specify functionalities for dynamically modifying functionality and content of a mobile application, in accordance with one or more implementations.

Application functionality information may include a notification functionality, a promotion functionality, a reward functionality, a payment functionality, a tweet functionality, a network functionality, and/or other functionalities. As illustrated in FIG. 3, notification functionality 308, promotion functionality 302, reward functionality 306, payment functionality 304, tweet functionality 310, and network functionality 312 may be provided to users in graphical administrative user interface 301 configured for selecting application functionalities.

Figure 4:
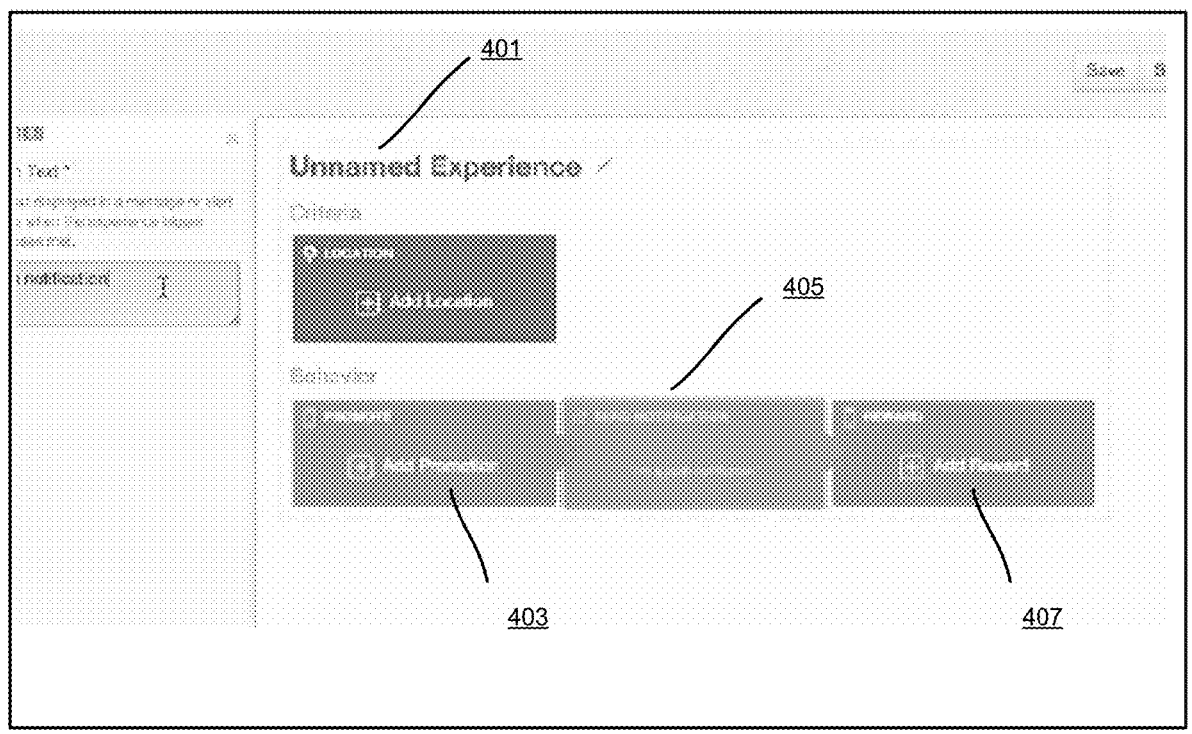
FIG. 4 illustrates an exemplary graphical user interface to specify requirements for dynamically modifying functionality and content of a mobile application, in accordance with one or more implementations.

As illustrated by FIG. 1, application component 106 may be configured to obtain notification functionality. Notification functionality may be configured to provide a notification to the end user satisfying user-specified real-world location requirement. The notification may include a phone call, an email, a text message (e.g., an SMS message or other text message), a message within the mobile application, a message in a social networking platform (e.g., Facebook, LinkedIn, Foursquare, Google+, Instagram, Snapchat and/or other social networking platforms), a micro-blogging service message (e.g., such as a message in the platform provided by Twitter, the platform provided by Tumblr, Blogger, Vine, and/or other micro-blogging platforms), and/or other notifications. As illustrated in FIG. 4, notification functionality 405 may be selected by a business or other entity user. Notification functionality 405 may be generated based on the end user satisfying location requirement 401.

Referring back to FIG. 1, notification functionality may be triggered by a time period at which the end user enters a particular real-world location including a geofence. In some implementations, there may be a time period during which entering the geofence does not result in the triggering of the notification (e.g., if it would otherwise).

Application component 106 may be configured to obtain the promotion functionality. Promotion functionality may be generated based on the end user satisfying user-specified real-world location requirement. As illustrated in FIG. 4, promotion functionality 403 may be selected by a business or other entity user. Promotion functionality 403 may be generated based on the end user satisfying location requirement 401.

Referring back to FIG. 1, promotion functionality may be configured to include promotion information related to an advertisement, a promotional offer, and/or other information offered by specific businesses or other entities to an end user located at real-world location. Promotion functionality may be configured such that the end user located at certain real-world location may receive promotion information within the mobile application related to a business or other entity associated with that real-world location. Promotion functionality may include promotional information including a business name, a logo, a promotional offer, a discount, an image containing promotional information, a video containing promotional information, and/or other promotional information. Promotion functionality may include promotion information including a link to a promotion or offer that takes the end user outside of the mobile application directly to the business or other entity's web site.

In some implementations, promotion functionality may be configured to provide promotion information to the end user based on certain demographic characteristics of the end user obtained by user component 108. For example, a hair salon may be offering a free service to all female customers under 25 years of age. Only end users that are female and under 25 may be able to receive this dynamically generated promotion.

Promotion functionality may be configured to provide a promotion notification to the end user based on the current real-world location of the end user obtained by user component 108. For example, a hair salon may have a special promotion only for customers of its downtown location. Determination that the end user has entered the geofence may be made by user component 108 based on the current end user location information of the end user client computing platform. Once it is determined that the end user has entered the geofence related to the downtown hair salon location, the promotion notification may notify the end user that a promotion is available. The promotion notification may include a phone call, an email, a text message (e.g., an SMS message or other text message), a message within the mobile application, a message in a social networking platform (e.g., Facebook, LinkedIn, Foursquare, Google+, Instagram, Snapchat and/or other social networking platforms), a micro-blogging service message (e.g., such as a message in the platform provided by Twitter, the platform provided by Tumblr, Blogger, Vine, and/or other micro-blogging platforms), and/or other notifications. The triggering of the promotion notification may be conditioned on a time at which the geofence was entered. Thus, only those end users that are located at certain location at a certain time may receive the promotion notification.

Application component 106 may be configured to obtain reward functionality. Reward functionality may be configured to include reward information related to rewards offered by specific businesses or other entities to the end users. Reward information may include reward information including a business name, a logo, reward points earned, levels attained, badges collected, an image containing reward information, a video containing reward information, and/or other reward information. Reward information may include a link to a reward and/or other information that takes the end user outside of the mobile application directly to the business or other entity's web site. As illustrated in FIG. 4, reward functionality 407 may be selected by a business or other entity user. Reward functionality 407 may be generated based on the end user satisfying location requirement 401.

Referring back to FIG. 1, in some implementations, reward functionality, may be configured to provide reward information to the end user based on certain demographic characteristics of the end user obtained by user component 108. For example, a restaurant may be offering reward points only to those customers that have "checked-in" to the restaurant via a social networking website and/or other website. Only end users that have "checked-in" into the restaurant via the social networking website may be able to receive this dynamically generated reward.

Reward functionality may be configured to provide a reward notification to the end user based on the current real-world location of the end user obtained by user component 108 as discussed elsewhere herein. For example, a restaurant may have a special reward only for customers that have visited a certain restaurant location within a certain time period. Determination that the end user has entered the geofence may be made by user component 108 based on real-world location information for the end user. Once it is determined that the end user has entered the geofence related to the restaurant within the specified time period, the reward notification may notify the end user that a reward is available. The reward notification may include a phone call, an email, a text message (e.g., an SMS message or other text message), a message within the mobile application, a message in a social networking platform (e.g., Facebook, LinkedIn, Foursquare, Google+, Instagram, Snapchat and/or other social networking platforms), a micro-blogging service message (e.g., such as a message in the platform provided by Twitter, the platform provided by Tumblr, Blogger, Vine, and/or other micro-blogging platforms), and/or other notifications. The triggering of the reward notification may be conditioned on a time at which the geofence was entered. In some implementations, there may be a time period during which entering the geofence does not result in the triggering of the reward notification (e.g., if it would otherwise).

Referring back to FIG. 1, application component 106 may be configured to obtain user-selected payment functionality. Payment functionality may be generated based on the end user satisfying user-specified real-world location requirement. Payment functionality may include payment information including digital payment options offered by specific businesses or other entities. As illustrated in FIG. 3, payment functionality 304 may be may be selected by a business or other entity user. Payment functionality 304 may be generated to provide digital payment option information based on the end user satisfying user-selected location requirements.

Referring back to FIG. 1, payment functionality may be configured to include payment information including a business or entity name, a logo, a type of digital payment offered, and/or other payment option information. For example, a retailer may be offering Apple Pay payment option to its waterfront-location customers. Only end users that are visiting the waterfront location of the retailer may be able to view this dynamically generated payment functionality.

Application component 106 may be configured to obtain user-selected tweet functionality. Tweet functionality may include twitter capabilities related to a specific business or other entity or related to a specific geographic location defined by the geofence, the beacon, and/or other input. As illustrated in FIG. 3, tweet functionality 310 may be selected by a business or other entity user. Tweet functionality 310 may be configured to provide an end user with an ability to participate in a Twitter type of micro blogging within the mobile application based on the end user satisfying user-selected application requirements.

Referring back to FIG. 1, in some implementations, tweet functionality 310 may contain Twitter related functionality including a hashtag, a location identification, and/or other functionality. For example, an end user may want to send a twitter post using the tweet functionality within the mobile application. The tweet functionality may be configured to dynamically generate hashtags related to the current real-world location of the end user and/or other information.

Application component 106 may be configured to obtain user-selected network functionality. Network functionality may be configured to include network information specifying social networking capabilities related to a specific business or other entity or related to a specific geographic location defined by the geofence, the beacon, and/or other input. As illustrated in FIG. 3, network functionality 312 may be selected by a business or other entity user. Network functionality 312 may be configured to provide social networking capabilities to an end user within the mobile application based on the end user satisfying user-selected application requirements.

Referring to FIG. 1, network information specifying social networking capabilities may include capabilities of interacting with participating end users. Participating end users may be other end users using the mobile application that are currently at the same real-world location as the end user. Interacting with participating end users via network functionality may include viewing participating end users, posting status updates visible to individual participating end users, posting status updates visible to all participating end users, sending notifications to participating individual end users, sending notifications to a group of participating end users, and/or other capabilities. For example, an end user may be at a conference and may be able to view all other users that are currently at the same conference. The end user may be able to send a message to another end user via the networking functionality of the mobile application.

Application component 106 may be configured to obtain user-selected functionality information that includes the messaging functionality. The messaging functionality may be configured to provide communication capabilities to the end user within the mobile application. The communication capabilities may be configured such that the mobile application includes a messaging portal within the mobile application that may be available to all mobile application users within the geographic location defined by the geofence, the beacon, and/or other input. The messaging functionality may include sending messages to a business entity, sending messages to other individual participating end users currently at the same real-world location and utilizing the mobile application, sending group messages to other participating end users, and/or other capabilities. For example, an end user currently residing in a hotel may utilize messaging functionality to contact concierge with a room service order detail.

Application component 106 may be configured to obtain user-selected functionality information that includes the gaming functionality. The gaming functionality may be configured to provide gaming capabilities to the end user within the mobile application. The gaming capabilities may be configured such that the mobile application includes a gaming portal within the mobile application that may be available to all mobile application users within the geographic location defined by the geofence, the beacon, and/or other input. The gaming portal may allow users to participate, observe, and/or otherwise interact with various mobile games, including trivia games, puzzle games, games of skill, games of luck and/or other games. Gaming functionality may be utilized by individual users as a single player games or may be played with other participating end users currently at the same real-world location and utilizing the mobile application, sending group messages to other participating end users, and/or other capabilities. For example, an end user currently residing in hotel may engage in a game of scrabble with other hotel guests and rewarded by the hotel with a free breakfast for winning the game.

Application component 106 may be configured to obtain user-selected functionality information that includes the survey functionality. The survey functionality may be configured to provide users with an ability to request feedback from end users within the mobile application. The survey functionality may be configured within the mobile application to provide users with an ability send surveys to the end user based on the current user location information of the end user client computing platform obtained by the user component as discussed elsewhere herein. Survey may include survey information including a list of question, a score card, an input for a review, and/or other information. For example, an end user currently residing in hotel may be asked to fill out a satisfaction survey concerning his most recent room service experience.

Application component 106 may be configured to obtain user-selected content information including a selection of desired content and/or other information to be dynamically generated within the mobile application of the end user's computing platform. Content information may include information specifically related to a business or entity and/or other information.

User component 108 may be configured to obtain current end user location information indicating a current real-world location of a client computing platform associated with the end user. The current real-world location of a client computing platform associated with the end user may include determination of a real-world position or a geographic location of the end user. User component 108 may be configured to use end user's client computing platform 104 to determine the geographic location of the end user based on one or more of signal strength, GPS, beacons, mesh networks such as Zigbee, cell tower triangulation, Wi-Fi location, receipt of real-world location from server 102, and/or other input. For example, an end user may have entered a hair salon located in Philadelphia, Pa. The end user's current real-world location may be obtained as the hair salon located in Philadelphia, Pa.

In some implementations, user component 108 may be configured to track the end user's movements using a geography based transmitter on end user's client computing platform 104 to determine real-world locations associated with the end user's movements. For example, an end user may enter a museum with various exhibits. As the end user travels from one exhibit to another, end user's real-world location may change to reflect end user's movement.

In some implementations, user component 108 may receive end user input referring to a future end user location. Future location may be a location end user is intending on visiting sometime at a later time on the same date. For example, end user may be visiting a museum later in the day. User component 108 may be configured to obtain the end user location as the museum as provided by the end user. Future location may be a location end user is intending on visiting sometime at a later date. For example, an end user may be traveling to a music festival during a last week of April. User component 108 may be configured to obtain the end user's location as the music festival as entered by the end user.

In some implementations, user component 108 may be configured to obtain demographic characteristics associated with the end user. Demographic characteristics may include end user's age, gender, interests, hobbies and/or other demographic characteristics. User component 108 may be configured to obtain user demographic characteristics as stated information from the end user, from an administrator, obtained from analysis of publicly available information associated with the user (e.g., public records, social media, and/or other sources), determined based on behavioral and/or demographic information related to the user, and/or other sources of demographic characteristics. For example, the user may enter user demographic characteristics directly from the user via user's input into client computing platform 104. In some implementations, user component 108 may be configured to obtain end user demographic characteristics from online public content. An online public content may include one or more of an online video content, a social media content, an online photo content, audio content, and/or other online public content. An online platform may include a networking platform a media platform, and/or other online platforms. The online platform may include the online public content and/or make the online public content available for consumption. For example, an online platform may include YouTube, Facebook, Twitter, Pinterest, LinkedIn, Foursquare, Google+, Flickr, Tumblr, Blogger, Vine, Instagram, Snapchat, Maker. TV and/or other online platforms. For example, end user may input into system 100 their name, age, and gender. Using the online public content, user component 108 may obtain data that specific user, based on photo content, prefers certain music performers.

Comparison component 110 may be configured to compare user information associated with the end user obtained by user component 108 including end user's current location information, one or more demographic characteristics of the end user, and/or other information with the user-selected application requirement information obtained by application component 106 specifying one or more of one or more real-world location requirements, one or more demographic characteristics, and/or other requirements. Comparison component 110 may be configured to compare current time with user-selected time period obtained by application component 106.

Comparison component 110 may be configured to determine whether information associated with the end user obtained by user component 108 including current end user's location information, one or more demographic characteristics of the end user, and/or other information satisfies the user-selected application requirement information obtained by application component 106 specifying one or more of one or more real-world location requirements, one or more demographic characteristics, and/or other requirements. Comparison component 110 may be configured to determine whether the current time satisfies the specified time period obtained by application component 106.

If comparison component 110 determines that information associated with the end user satisfies he user-selected application requirement information, the dynamically generated application functionality and content may be transmitted to the end user's mobile application.

Functionality component 112 may determine and/or obtain application functionality information specifying mobile application functionalities and/or other information obtained by application component 106. The application functionality information may include the notification functionality, the promotion functionality, the reward functionality, the payment functionality, the tweet functionality, the network functionality, the messaging functionality, the gaming functionality, the survey functionality and/or other functionalities. Based upon the user-selected application functionality information, functionality component 112 may determine the mobile application functionalities.

Functionality component 112 may determine additional information specific to the end user based on the demographic and/or other information obtained by user component 108. Additional information may include the mobile application layout information, design information, and/or other information.

Content component 114 may be configured to determine and/or obtain the application content specifying mobile application content information corresponding to the user-selected content information obtained by application component 106 and/or other information. The application content information may include application layout information, application visual information, business or other entity name, location, and/or other content. For example, a business or other entity user may select a location corresponding to a museum that would trigger generation of application functionality and content of a mobile application. The user-selected content information corresponding to the museum location may include a museum logo, a museum name, museum working hours, expositions available at the museum, museum gift shop information, museum café information, application layout, and/or application color scheme incorporating museum logo colors. End users located in the museum may be able to view this dynamically generated content within the mobile application.

Presentation component 116 may be configured to effectuate presentation of the application functionality and content to the end user's mobile application in response to the determination by comparison component 110 that information associated with the end user obtained by user component 108, including current end user's location information, one or more demographic characteristics of the end user, and/or other information satisfies the user-selected requirement information obtained by application component 106 specifying one or more real-world location requirements, one or more demographic characteristics, and/or other requirements. Presentation component 116 may be configured to effectuate presentation of the application functionality and content to the end user's mobile application in response to the determination by comparison component 110 that the current time satisfies the user-specified time period requirement obtained by application component 106.

Presentation component 116 may be configured to effectuate presentation of the application functionality including functionality information determined and/or obtained by functionality component 112. Application functionalities may include the notification functionality, the promotion functionality, the reward functionality, the payment functionality, the tweet functionality, the network functionality, the messaging functionality, the gaming functionality, the survey functionality and/or other functionalities.

Presentation component 116 may be configured to effectuate presentation of the mobile application content specifying content corresponding to the user-selected content information obtained by content component 114. The content may include the application layout information, application visual information, business or other entity name, location, and/or other content. In some implementations, the content may include certain contextually specific content and/or other information. For example, a hair salon that offers services by an apprentice hair stylist may include the information of the apprentice stylist working hours to end users in a certain demographic category.

Figure 5:
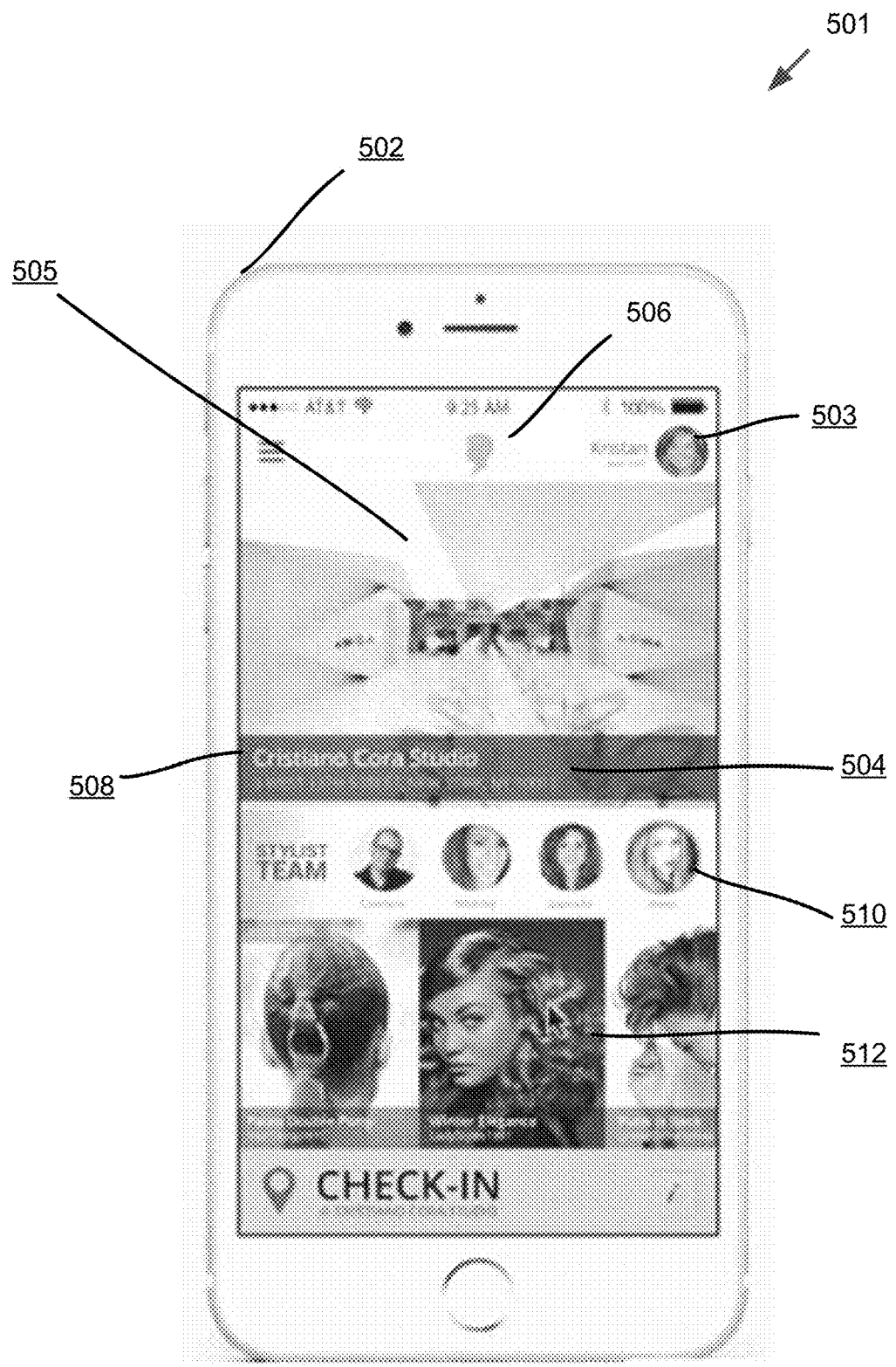
FIG. 5 illustrates an exemplary dynamically modified functionality and content of a model application, in accordance with one or more implementations.

As illustrated in FIG. 5, end user located in the same real-world location as a hair salon may view application functionality and content 505 related to a hair salon. Application functionality and content 505 within mobile application 501 on end user's client computing platform 502 may be generated in response to the end user's location satisfying user-selected location requirement and current time satisfying user-selected time period. Application functionality and content 505 may include user information 503 which is end user's name. Application functionality and content 505 may include location information 504 corresponding to the hair salon real-world address. Application functionality and content 505 includes content may include hair salon logo 506, hair salon name 508, stylist team information 510, and styles offered by the hair salon 512.

Referring back to FIG. 1, in some implementations, presentation component 116 may be configured to effectuate presentation of application requirements obtained by application component 106 specifying application requirement information including one or more of real-world location information, the time period, and/or other information. Presentation component 116 may be configured to effectuate presentation of user information obtained by user component 108 including user demographic information, such as name, age, interests, and preferences.

In some implementations, presentation component 116 may be configured to effectuate presentation of the application functionality and content based on other user-selected information. For example, an end user may not be interested in social networking. Network functionality may be omitted from this particular end user's mobile application.

In some implementations, the application functionality and content may be generated based on the real-world location of the end user's client computing platform that may be defined by a geofence and may be iteratively updated as the end user's position changes with respect to the beacons placed within the geofence. For example, an end user may be presented with application functionality and content related to open house information available with a real estate firm based on the end user's real-world location within the real estate firm's geofence. As the end user is touring houses offered by the real estate firm and moving from one house to the next, the end user is presented with application functionality and content generated in response to the user's movement with respect to the beacons corresponding to houses the end user is touring.

Referring again to FIG. 1, in some implementations, server(s) 102, client computing platform(s) 104, and/or external resources 120 may be operatively linked via one or more electronic communication links. For example, such electronic communication links may be established, at least in part, via network 103 such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with network 103 and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 108, 110, 112, 114, 116, and/or other components. The processor(s) 124 may be configured to execute components 106, 108, 110, 112, 114, 116, and/or other components by software; hardware; firmware; some combination of software, hardware, and/or firmware; and/or other mechanisms for configuring processing capabilities on processor(s) 124.

It should be appreciated that although components 106, 108, 110, 112, and 114 are illustrated in FIG. 1 as being co-located within a single processing unit, in implementations in which processor(s) 124 includes multiple processing units, one or more of components 106, 108, 110, 112, 114 and 116 may be located remotely from the other components. The description of the functionality provided by the different components 106, 108, 110, 112, 114 and/or 116 described herein is for illustrative purposes, and is not intended to be limiting, as any of components 106, 108, 110, 112, 114 and/or 116 may provide more or less functionality than is described. For example, one or more of components 106, 108, 110, 112, 114 and/or 116 may be eliminated, and some or all of its functionality may be provided by other ones of components 106, 108, 110, 112, 114 and/or 116. As another example, processor(s) 124 may be configured to execute one or more additional components that may perform some or all of the functionality attributed herein to one of components 106, 108, 110, 112, 114 and/or 116.

Figure 6:
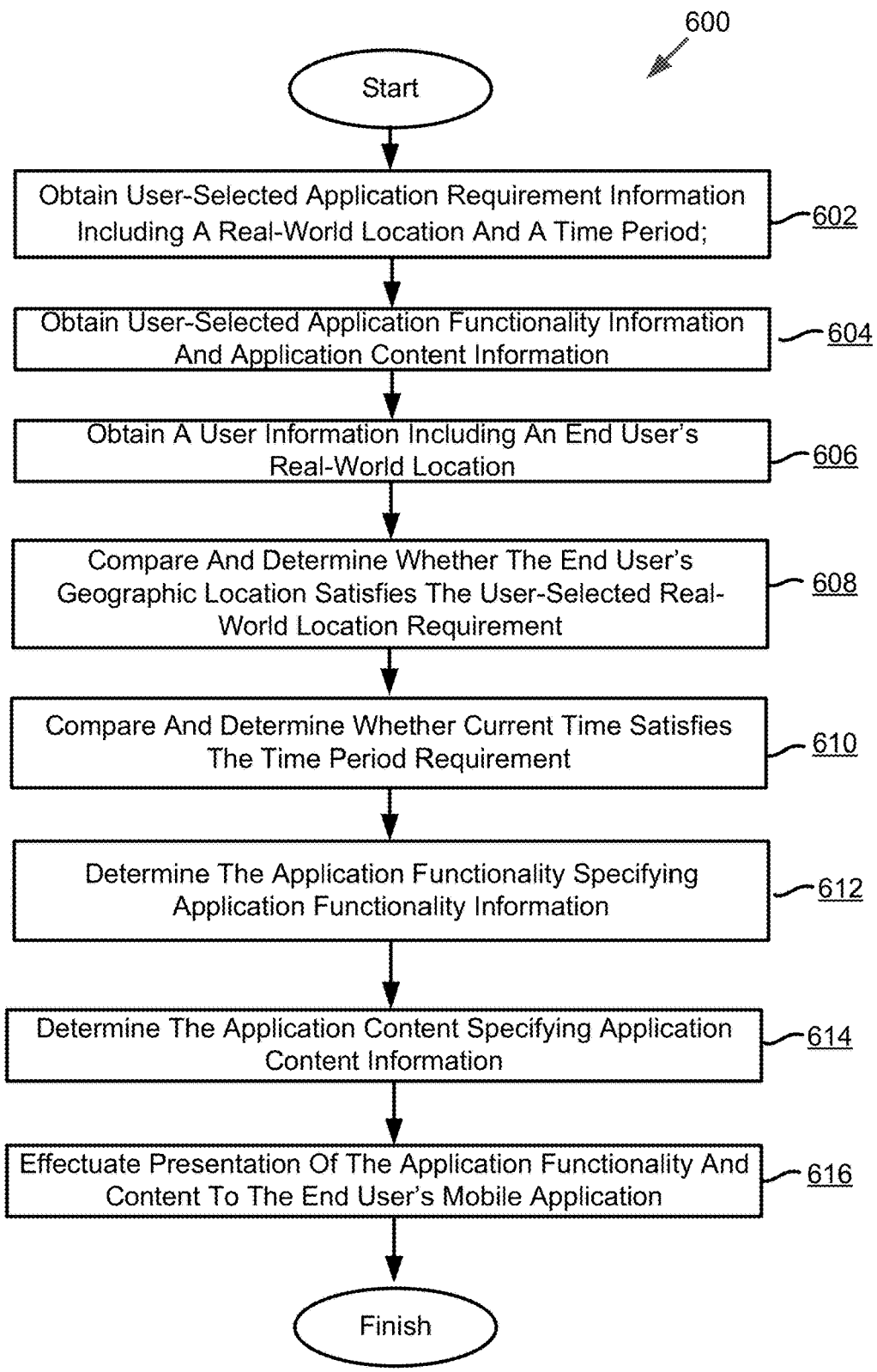
FIG. 6 illustrates a method for dynamically modifying functionality and content of a mobile application, in accordance with one or more implementations.

FIG. 6 illustrates a method 600 for dynamically modifying functionality and content of a mobile application based satisfying one or more real-world location requirements, a time period, and/or other requirements, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, a user-selected application requirement information may be obtained. The application requirement information may specify a real-world location requirement, a time period, demographic information, and/or other information. At an operation 604, a user-selected functionality information and content information may be obtained. The application functionality information and content information may specify dynamically generated functionalities and content of the mobile application based on an end user satisfying application requirements. Operation 602 and operation 604 may be performed by an application component that is the same as or similar to application component 106, in accordance with one or more implementations.

At an operation 606, a user information associated with an end user may be obtained. The user information may include current end user's location information indicating a current real-world location of a client computing platform associated with the end user, and/or other information. Operation 606 may be performed by a user component that is the same as or similar to user component 108, in accordance with one or more implementations.

At an operation 608, the current end user's location information indicating a current real-world location of the client computing platform associated with the end user may be compared with the real-world location specified by the application requirement information. At the operation 608, a determination may be made whether the current end user's location information satisfies the real-world location specified by the application requirement information. At an operation 608, a current time may be compared with the time period specified by the application requirement information. At the operation 608, a determination may be made whether the current time satisfies the time-period specified by the application requirement information. Operations 608 and 610 may be performed by a comparison component that is the same as or similar to comparison component 110, in accordance with one or more implementations.

At an operation 612, an application functionality specifying application functionality information of the mobile application may be obtained. The application functionality information may include the notification functionality, the promotion functionality, the reward functionality, the payment functionality, the tweet functionality, the network functionality, the messaging functionality, the gaming functionality, the survey functionality and/or other functionalities. Operation 612 may be performed by a functionality component that is the same as or similar to functionality component 114, in accordance with one or more implementations.

At an operation 614, an application content specifying application content information of the mobile application may be obtained. The content information may include application layout information, application visual information, business or other entity name, location, and/or other information. Operation 614 may be performed by a content component that is the same as or similar to content component 112, in accordance with one or more implementations.

At an operation 616, responsive to current end user's location information and the current time satisfying user-selected location and time period requirements, application functionality and content may be dynamically generated and presented to the end user within the mobile application. The functionality and content may include functionality information, a content information, and/or other information. Operation 616 may be performed by a presentation component that is the same as or similar to presentation component 116, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to dynamically generate application functionalities in a mobile application on an end user client computing platform, the system comprising:
   one or more processors configured to execute computer program modules that, when executed by the one or more processors, configure the one or more processors to:
      obtain user selection of application information defining application requirements within the mobile application, the user-selected application information specifying at least a location requirement, a time period, and
      functionality information specifying dynamically generated application functionalities wherein obtaining the user-selected application information includes obtaining the user-selected application information via a graphical user interface of the mobile application configured to receive entry or selection of the user-selected application information from a user that is different from the end-user;
      obtain current user location information indicating a current location of a client computing platform associated with the end user;
      compare the current user location information with the location requirement of the application requirements;
      compare a current time with the time period of the application requirements;

responsive to the current user location information of the end user's client computing platform and the current time satisfying the location requirement and the time period of the application requirements, dynamically generating the application functionalities for the mobile application specified by the functionality information obtained from the user-selected application information, and dynamically generating end user personalized content; and transmitting to the end user mobile application components for implementing the application functionalities and the end user personalized content.

2. The system of claim 1, wherein the user has administrative access to the mobile application.

3. The system of claim 1, wherein the end user does not have administrative access to the mobile application.

4. The system of claim 1, wherein the functionality information specifying dynamically generated application functionalities includes one or more of a promotion functionality, a reward functionality, a payment functionality, a notification functionality, a tweet functionality, a messaging functionality, a gaming functionality, a survey functionality, or a network functionality.

5. The system of claim 1, wherein the one or more processors are further configured to:

obtain current user demographic information indicating demographic characteristics of the end user, wherein the current user demographic information includes one or more of age, gender, interests, hobbies, and/or other demographic information; and compare the current user demographic information with the end user demographic requirements of the application requirements, wherein the application functionalities are dynamically generated responsive to the current user demographic information satisfying the end-user demographic requirements.

6. The system of claim 4, wherein the notification functionality obtained during functionality information selection is configured to: (i) obtain notification information specifying a real-world location requirement that will trigger a notification within the mobile application on the client computing platform, (ii) compare current user location information of the end user client computing platform with the real-world location requirement for the notification, and (iii) responsive to the current user location information indicating the end user client computing platform has satisfied the real-world location requirement for the notification, transmitting a notification transmission to the end user client computing platform.

7. The system of claim 6, wherein the notification transmission includes one or more of an email, a message in a social networking platform, a message in a micro-blogging service, a text message, a phone call, or a mobile application message.

8. The system of claim 4, wherein the reward functionality obtained during functionality information selection is configured to: (i) obtain reward information specifying a real-world location requirement that will trigger a reward notification within the mobile application on the client computing platform, (ii) compare current user location information of the end user client computing platform with the real-world location requirement for the reward notification, and (iii) responsive to the current user location information indicating the end user client computing platform has satisfied the real-world location requirement for the reward notification, transmitting a reward notification transmission to the end user client computing platform.

9. A method for dynamically generating application functionalities in a mobile application on an end user client computing platform:

obtaining user selection of application information defining application requirements within the mobile application, the user-selected application information specifying at least a location requirement, a time period, and functionality information specifying dynamically generated application functionalities, wherein obtaining the user-selected application information includes obtaining the user-selected application information via a graphical user interface of the mobile application configured to receive entry or selection of the user-selected application information from a user that is different from the end user;

obtaining current user location information indicating a current location of a client computing platform associated with the end user;

comparing the current user location information with the location requirement of the application requirements;

comparing a current time with the time period of the application requirements;

responsive to the current user location information of the end user's client computing platform and the current time satisfying the location requirement and the time period of the application requirements, dynamically generating the application functionalities for the mobile application specified by the functionality information obtained from the user-selected application information, and dynamically generating end user personalized content; and transmitting to the end user mobile application components for implementing the application functionalities and the end user personalized content.

10. The method of claim 9, wherein the user has administrative access to the mobile application.

11. The method of claim 9, wherein the end user does not have administrative access to the mobile application.

12. The method of claim 9, wherein the functionality information specifying dynamically generated application functionalities includes one or more of a promotion functionality, a reward functionality, a payment functionality, a notification functionality, a tweet functionality, a messaging functionality, a gaming functionality, a survey functionality, or a network functionality.

13. The method of claim 9, the method further comprising:

obtaining current user demographic information indicating demographic characteristics of the end user, wherein the current user demographic information includes one or more of age, gender, interests, hobbies, and/or other demographic information; and comparing the current user demographic information with the end user demographic requirements of the application requirements, wherein the application functionalities are dynamically generated responsive to the current user demographic information satisfying the end-user demographic requirements.

14. The method of claim 12, wherein the notification functionality of the functionality information obtained during functionality information selection is configured to: (i) obtain notification information specifying a real-world location requirement that will trigger a notification within the mobile application on the client computing platform, (ii) compare current user location information of the end user client computing platform with the real-world location requirement for the notification, and (iii) responsive to the current user location information indicating the end user client computing platform has satisfied the real-world location requirement for the notification, transmitting a notification transmission to the end user client computing platform.

15. The method of claim 14, wherein the notification transmission includes one or more of an email, a message in a social networking platform, a message in a micro-blogging service, a text message, a phone call, or a mobile application message.

16. The method of claim 12, wherein the reward functionality of the functionality information obtained during functionality information selection is configured to: (i) obtain reward information specifying real-world location requirement that will trigger a reward notification within the mobile application on the client computing platform, (ii) compare current user location information of the end user client computing platform with the real-world location requirement for the reward notification, and (iii) responsive to the current user location information indicating the end user client computing platform has satisfied the real-world location requirement for the reward notification, transmitting a reward notification transmission to the end user client computing platform.

* * * * *